(12) United States Patent
Hahn et al.

(10) Patent No.: US 7,689,925 B2
(45) Date of Patent: Mar. 30, 2010

(54) COPY AND PASTE EXTENSIBILITY

(75) Inventors: Henry D. Hahn, Bellevue, WA (US); Evgeny N. Veselov, Sammamish, WA (US); Sangil Jeon, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 516 days.

(21) Appl. No.: 11/225,725

(22) Filed: Sep. 13, 2005

(65) Prior Publication Data
US 2007/0061747 A1   Mar. 15, 2007

(51) Int. Cl.
*G06F 3/00* (2006.01)
*G06F 9/00* (2006.01)
*G06F 17/00* (2006.01)

(52) U.S. Cl. .................. 715/770; 715/784; 715/769
(58) Field of Classification Search ............. 715/770, 715/764, 769, 784
See application file for complete search history.

(56) References Cited

U.S. PATENT DOCUMENTS 7,293,242 B2 * 11/2007 Cossey et al. ............. 715/770
2003/0004957 A1 * 1/2003 Broman et al. ............ 707/100
2005/0091603 A1 * 4/2005 Chen et al. ................ 715/769
2005/0149871 A1 * 7/2005 Broman et al. ............ 715/724

OTHER PUBLICATIONS

"Special Edition Using Microsoft Office 2000", May 1999 pp. 138-145.*

* cited by examiner

*Primary Examiner*—Kieu Vu
*Assistant Examiner*—Sabrina L. Greene
(74) *Attorney, Agent, or Firm*—Workman Nydegger

(57) ABSTRACT

Described is technology allowing computer programs to participate in the copy and paste process at various times. A source program, from which data is requested to be copied to the clipboard, may participate as desired, including, for example, to cancel the copy, or to determine which data formats will be placed on the clipboard, including one or more custom data formats. A target program, to which data may be copied from the clipboard, may also participate as desired, including, for example, to cancel the paste, or to determine which data format will be pasted, which may be a custom data format. In one implementation, events provide notifications and APIs may be called to facilitate the communication.

18 Claims, 4 Drawing Sheets

COPY AND PASTE EXTENSIBILITY

BACKGROUND

One of the more valuable features of contemporary computer systems is the ability to copy (or cut) content from one program or program instance and paste the content into another program or instance. In general, the operating system provides a clipboard in which the content is maintained in various formats. Upon pasting, a default format is selected for the content, or the user can select another format, e.g., via a "Paste Special" operation.

In general, the operating system provides the primary cut and paste mechanism for editing, whereby the application author is not able to participate in the process. As a result, computer application programs are limited in what they can accomplish with regard to copying (or cutting) and pasting data.

SUMMARY

Briefly, various aspects of the present invention are directed towards allowing programs to participate in the copy and paste process at various times. The source program, from which data is requested to be copied to the clipboard, may participate as desired, including, for example, to cancel the copy, or to determine which data formats will be placed on the clipboard, including one or more custom data formats. Upon receiving an event corresponding to a request to copy data from a source program to a clipboard, an editor and the source program communicate to allow the source program to participate in the copying of data to the clipboard.

A target program, to which data may be copied from the clipboard, may also participate as desired, including, for example, to cancel the paste, or to determine which data format will be pasted, which may be a custom data format. Upon receiving an event corresponding to a request to paste data from a clipboard to the target program, an editor and the target program communicate to allow the target program to participate in the pasting of data from the clipboard.

Other advantages will become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Exemplary Operating Environment

Figure 1:
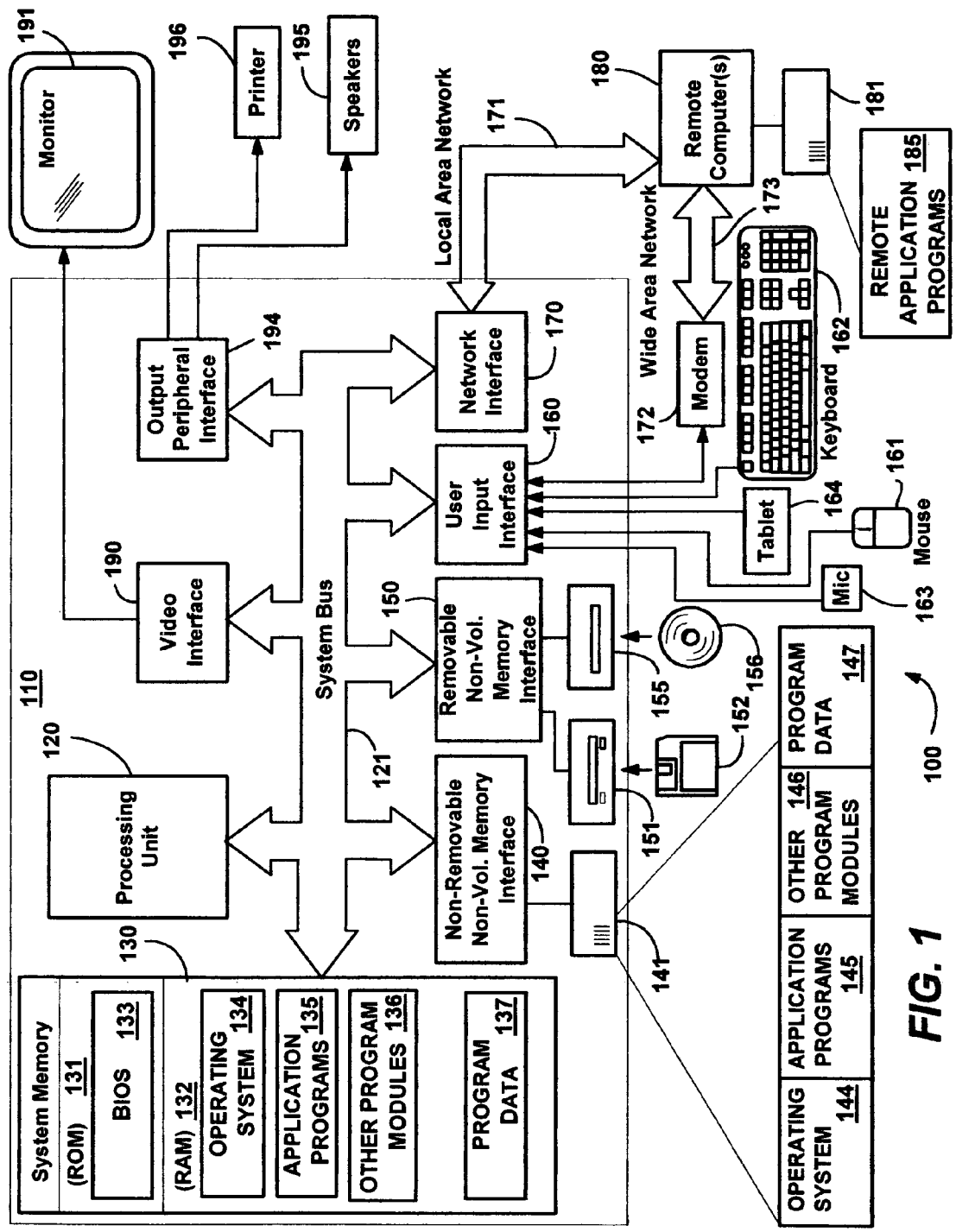
FIG. 1 shows an illustrative example of a general-purpose computing environment into which various aspects of the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Copy and Paste Extensibility

Various aspects of the technology described herein are directed towards extended copy and paste technology, wherein as used herein, the term "copy" and its derivatives (e.g., copying) implicitly refer to "cut" operations (e.g., "cutting" and the like) which is essentially a copy and delete operation, as well as dragging, except where otherwise noted. Pasting similarly refers to dropping, except where otherwise noted.

In general, the extended copy and paste technology allows an application program to provide code for participating with the operating system's copy and paste components, to provide code for handling all of an application program's copy and/or paste operations, or to simply use the operating system's copy and paste mechanism, e.g., in a conventional manner. To this end, in one implementation, the operating system provides an application programming interface (API) set and notification mechanism for communicating copy and paste-related information to and from application programs. However, as will be understood, the present invention is not limited to APIs and notifications, or even to operating systems, but rather to any medium that allows transfer of content from one program to another. As such, any of the examples mentioned herein are non-limiting, and the present invention may be used various ways that provide benefits and advantages in computing in general.

Figure 2:
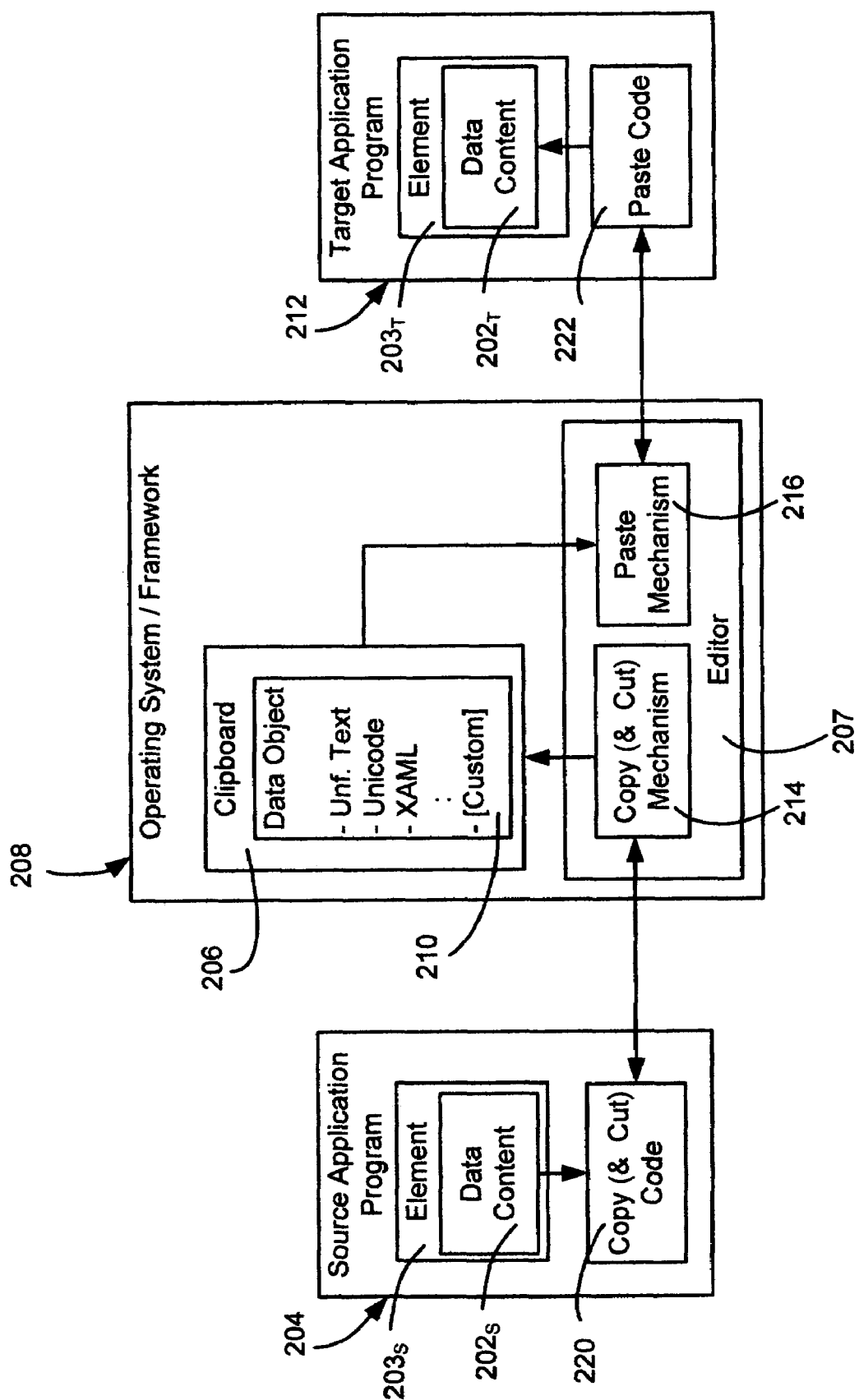
FIG. 2 is a block diagram representing example components for extending copy and paste for selective use by application programs.

Turning to FIG. 2 of the drawings, there is shown an example implementation in which data content $202_S$ is copied from a source application program 204 (e.g., from an element $203_S$ therein having a selection marked) to a clipboard 206 of an operating system/framework 208. Some time later, data from the clipboard 206, e.g., maintained in a data object 210, may be pasted to one or more target application programs 212 as data content $202_T$, (e.g., to an element $203_T$ therein having focus). Note that in general, data content may be copied to the clipboard in multiple formats, and a selected one of the formats may be pasted from the clipboard 206.

To copy and paste between application programs, which may be different instances of the same program, an editing component 207 of the operating system/framework 208 provides a copy mechanism 214 and a paste mechanism 216. As described below, the source application program 204 may participate in the copy operation via its own copy code 220. Similarly, the target application program 212 may participate in the paste operation via paste code 222.

In general, the source application program 204 from which content is being copied to the clipboard is able to provide code to handle the operation on its own, essentially with no support from the operating system. Alternatively, the source program code 220 may work in conjunction with the copy mechanism 214 of the operating system, and may include code that participates in the copy operation essentially before copying, during copying, and/or after copying, as described below. For example, the source program 204 may wish to copy data onto the clipboard 206 in a custom format, such as an enhanced format (e.g., a list format and/or object format) that only a certain other application program (such as another instance of the same program) can understand. Also the source program 204 may not wish to have a certain format or formats included on the clipboard's available formats, e.g., only encrypted content may be copied, such as to limit plaintext or visible image pasting to only target programs that have the correct decryption key.

The target program 212 to which the content may be pasted also may include paste code 222 that participates in the paste operation. The participation essentially may be before paste takes place, during the paste operation, and/or after the paste. For example, a program can cancel a paste, modify a property on the data object that contains the content in the various formats, select a format other than the default format, including a custom format, (even if the user has not requested paste special), and the like.

To enable application programs to perform their own handling of copy and paste, even when there is a default implementation for a given editor 207, notification of an operation that is about to occur, along with access to the data being used, are provided. For copy, a source application program 204 may need to provide the data to the data object 210 placed on the clipboard 206 so that this data can be de-serialized upon paste at some later time.

For paste, a target application program 212 may need to interpret the data object 210 from the clipboard 206 in a manner specific to the target application program 212, or the default implementation of paste may not know how to paste custom data from a data object.

Because the application programs may now be included in the performance of copy and paste operations, the programs may also need to be including in specifying whether associated commands (Cut, Copy, Paste and Drag and Drop) are enabled for a given focused element. Note that any text editor will have the same requirements, and thus events are "attached" or fired from any editor that wishes to expose this functionality. In one implementation the copy command is issued as a bubbling event from an element; it does not, matter which element raised the event, however the event starts from that element.

When a standard command such as copy is fired as a command event, the editor component 207 (e.g., TextEditor) handles this by default. The source application program 204 is given an opportunity to participate in the copy process. More particularly, an editor component 207 attached either at or above the command-issuing element receives a notification corresponding to the copy command. At this point, the process of actually performing the copy operation starts.

Figure 3:
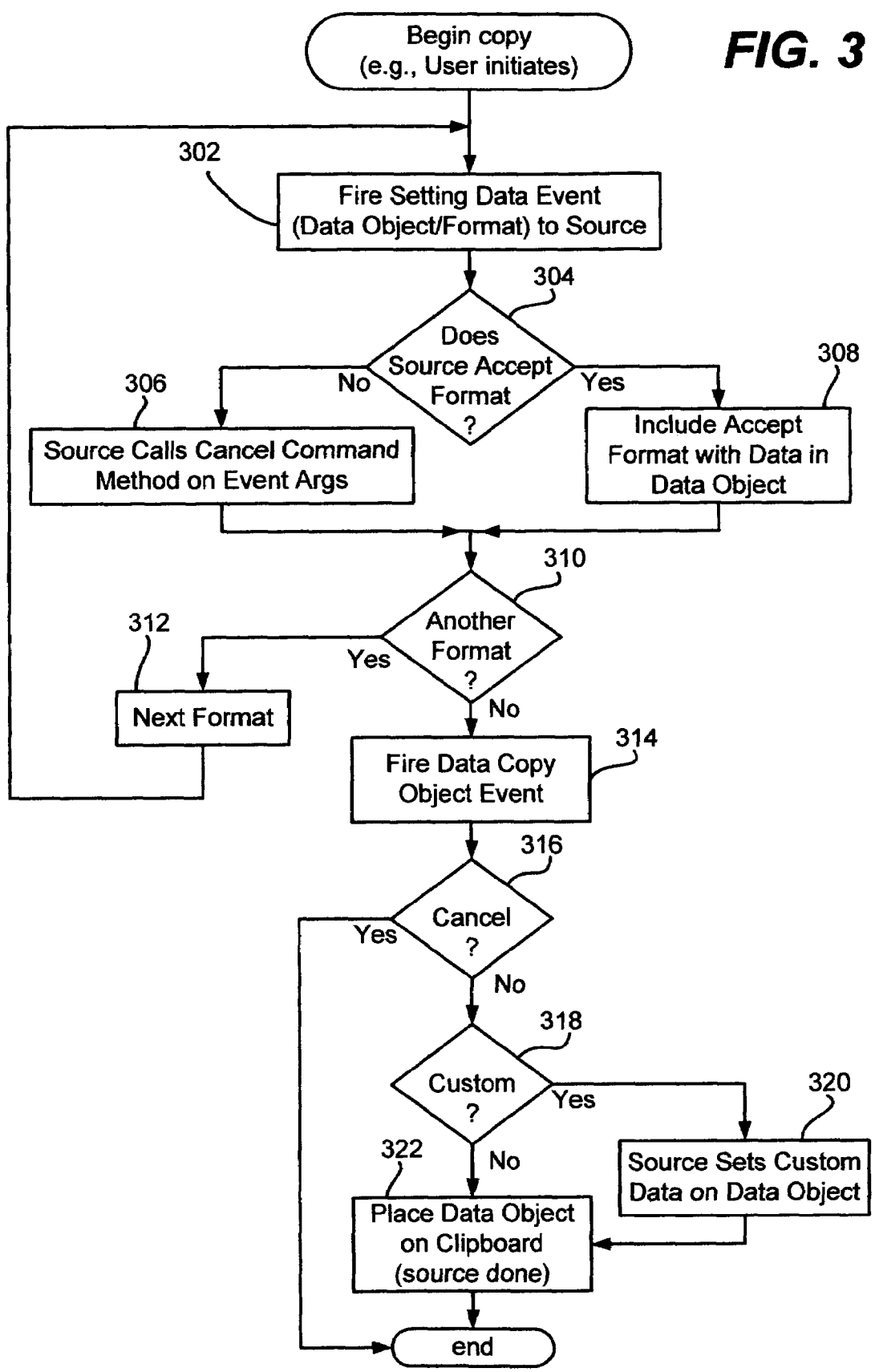
FIG. 3 is a flow diagram representing example decisions and actions that may be taken as part of a copy operation.

FIG. 3 represents example steps taken for handling copy, wherein in general, the copy mechanism 214 of the editor 207 attempts to parse the selection and place it in an instance of the data object 210. As will be understood, this is an iterative process, as the process determines as many available formats as possible to copy to the data object 210.

More particularly, in one example implementation, step 302 of FIG. 3 represents the editor 207 firing a "Setting Data" event to the source application program 204, e.g., along with a possible format for inclusion. Note that such an event can be raised before this point, in an alternative implementation. As part of the event, the notification will pass an argument that allows access to the data object 210, (e.g., IDataObject). The IDataObject can be manipulated with normal IDataObject members.

If the source application program 204 does not accept the format (step 304), the source cancels that format, e.g., calls a cancel command method provided via event arguments. Otherwise, that format for the data is included in the data object at step 308, thereby building up the format or formats for the data that are available for pasting.

Steps 310 and 312 repeat the iterative process until no formats remain to be potentially added. Note that the source object thus has a way to determine exactly which format or formats are placed in the data object 210.

Before placing the data object 210 onto the clipboard 206, the source program is given a notification that the copy to the clipboard 206 is about to take place. This gives a source program 204 the ability to cancel any copying, as represented at step 316. For example, a source program 204 that does not want any copying to take place need not separately cancel every possible format, but rather can simply cancel the entire copy command at step 316. To this end, in one implementation, to cancel the source program 204 sets a "RoutedEventArgs.Handled" member to "true" to prevent the copying of the data object 210 to the clipboard 206 from taking place. Alternatively, the source program can handle the entire copy operation on its own, and set the "RoutedEventArgs.Handled" member to "true" to prevent further copying by the editor 207.

If not handled, (canceled or handled directly), via steps 318 and 320 the source program 204 is also given an opportunity to add custom data (e.g., one or more custom formats) to the data object 210. As described above, this extends the ability of a program to transfer data to an appropriate target program via the copy and paste mechanism.

The actual data object 210 is "pushed" to the clipboard 206 at step 322. At this time, the source program 204 is finished interacting with the copy mechanism 214. Note that if the command was a "Cut" command instead of a "Copy" copy command, the selection of content that was copied is deleted. Note that even if canceled, e.g., regardless of the Handled property's value, the deletion will be allowed to take place.

Figure 4:
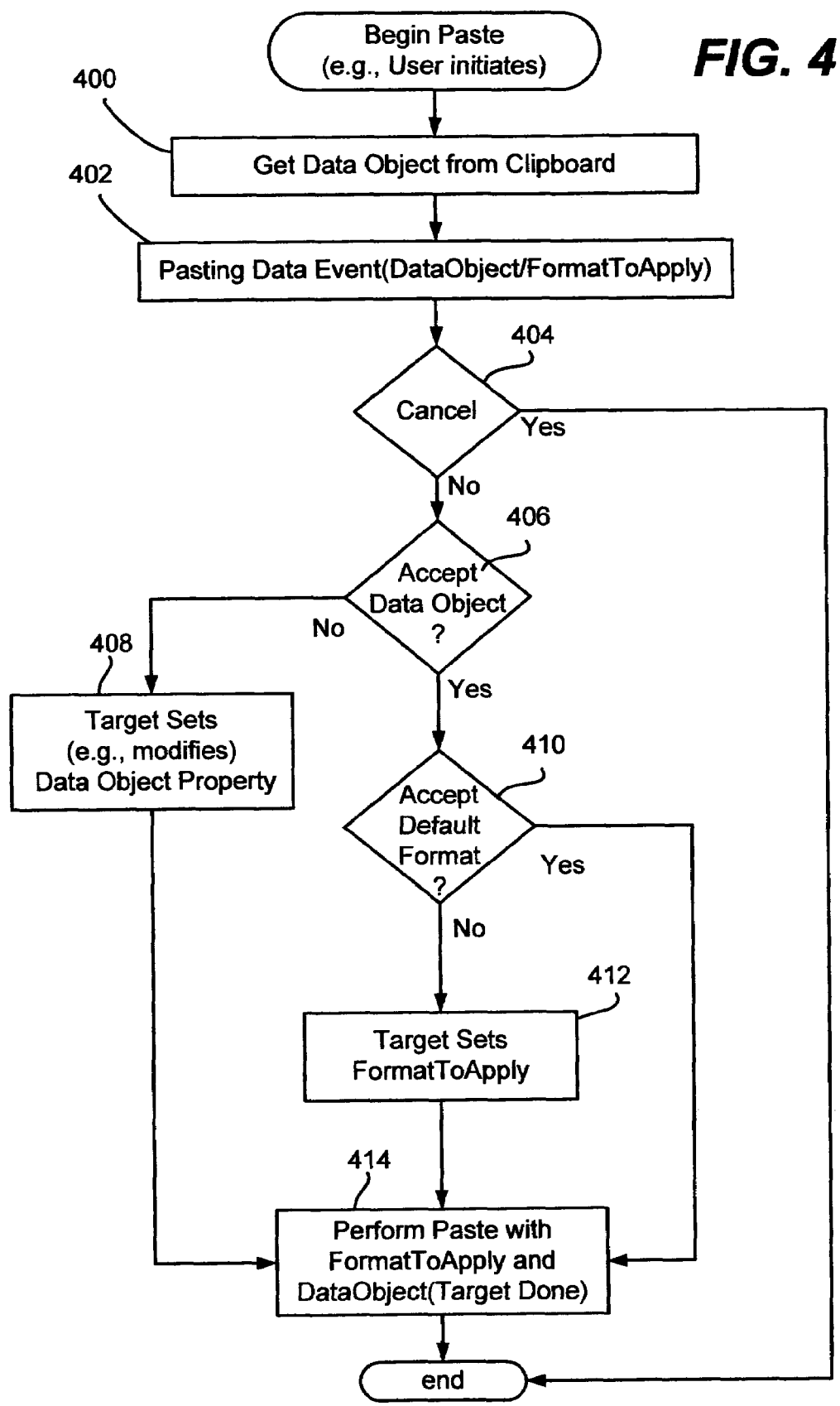
FIG. 4 is a flow diagram representing example decisions and actions that may be taken as part of a paste operation.

FIG. 4 represents an example paste process, in which the Paste command is similarly issued as a bubbling event, and wherein which element raises the event does not matter, however the event starts from that element. An editor attached either at or above the command-issuing element receives notification of the Paste command. At this point, the process of actually performing the paste operation starts.

Step 400 represents getting the data object 210 from the clipboard 206, and step 402 represents a pasting data event. In one implementation, at this point, the target program 212 has access to the IDataObject via the event arguments. Step 404 gives the target the opportunity to cancel the paste operation entirely, or handle it on its own. For example, the target program may set the RoutedEventArgs.Handled to "True" so that the process bypasses the editor's pasting steps. Again, the target program 212 is given the opportunity to participate in the paste operation, including preventing or directly handling the paste before an actual paste occurs.

Step 406 represents determining whether the target program 212 accepts the data object 210 in its current state. For example, the data object 210 may contain a number of data formats, and the target program 212 can determine as part of the pasting process whether it wants any of those formats. If not, the target program 212 can modify a property of the data object 210, for example to enhance the data prior to the actual paste, as described below.

If the data object is acceptable to the target program 212, the target program 212 can select the default format chosen for it, e.g., the editor 207 may determine the richest available data for the IDataObject on the clipboard 210 for the target element, and use that data for pasting. Otherwise, the target program 212 can select a different format, as represented by step 412. This may be data in a format that the target deems more appropriate for its use, e.g., plaintext instead of rich text or XAML. The selected data also may be custom data placed by the source, as described above with reference to step 320 of FIG. 3. The target program may give the user an opportunity to select a format, e.g., a menu or other input mechanism, as if the user selected "Paste Special" or the like, even if not actually selected.

At step 414, (if not canceled at step 404) a copy of the actual selected or default data is inserted from the data object 210 into the target element of the target program 212, e.g., the element that raised the event. As can be readily appreciated, the target program 212 is thus given opportunities to cancel the paste, change the property of the data to be pasted, or select a particular format from among those available.

The applicability of a command such as copy and paste is dependent on a number of factors, including what element has focus and whether the command can be applied, (e.g., based on rules of the editor, the state of the clipboard, and so forth). Often, the status of a command is used to enable or disable a toolbar button or menu item. The default implementations of copy and paste in one framework, (e.g., managed NET code/Common Language Runtime or CLR) is able to understand when commands are applicable. However, in the case that an application program overrides the rules of the editor by customizing the handling of copy and paste operations, the ability to determine the applicability of a command is not possible.

Therefore, in one implementation, an OnCheckingCommandStatusEvent is made available. This event is fired at the time that a command status is queried, but before the status is reported. This event gives the target application program 212 the opportunity to specify whether or not it knows how to apply data from the clipboard 206 to the focused element. The application program 212 can do this by calling a DataFormatAccepted method on the arguments. Note that it is not possible to "unaccept" the data, since several consumers of the event could make different decisions, however if at least one program can handle the data, such a program should be allowed to do so.

Returning to step 408, it is possible that the target program recognizes the data as having more than its straightforward meaning, e.g., as text. For example, "contacts" data may be present in the data object 210, and a target application program that recognizes text on the clipboard as contacts data can do more with that data than simply paste the data as is. For example, the target program can access a database indexed by something in the data, and associate an image from that database with the contacts data.

With reference to drag and drop, such concepts are primarily manifestations of the copy and paste events, in a similar form. The events notifying of data transfer operations will be fired, as described above. The application will need to listen to the QueryContinueDrag, GiveFeedback and DragEvent (DragEnter, DragOver, DragLeave and Drop), e.g., to change the icon or handle drag and drop events appropriately.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. At least one computer-readable storage medium having stored computer-executable instructions, which when executed perform a method for allowing a computer program to participate in a copy process, the method comprising:

receiving at an editor of an operating system a first notification corresponding to a request to copy data from a source program to a data object of a clipboard of the operating system;

in response to the first notification, the editor sending a second notification to the source program, the second notification including a first format that the editor of the operating system proposes for the data to be copied from the source program to the data object of the clipboard of the operating system;

upon receiving the second notification, the source program determining whether to accept the first format that was proposed by the editor for inclusion in the data object such that if the source program accepts the first format, the data is copied from the source program and stored in the data object in the first format, otherwise, if the source program rejects the first format, the data is not stored in the data object in the first format; and providing the source program with access to the data object of the clipboard such that the source program directly copies the data from the source program and stores the data in the data object in a second format, the second format being determined by the source program rather than being proposed by the editor.

2. The computer-readable storage medium of claim 1 wherein receiving the first notification comprises receiving a bubbling event from an element in the source program.

3. The computer-readable storage medium of claim 1 wherein the second notification sent to the source program further includes a mechanism by which the source program may cancel the copying of data to the data object of the clipboard.

4. The computer-readable storage medium of claim 1 further comprising repeating the steps of the editor proposing a format and the source program accepting or rejecting the format for each available format.

5. The computer-readable storage medium of claim 1 having further computer-executable instructions comprising, pasting data from the clipboard to a target program.

6. The computer-readable storage medium of claim 1 wherein the request to copy data from a source program corresponds to a cut operation, and having further computer-executable instructions comprising deleting a selection corresponding to data in the source program.

7. The computer-readable storage medium of claim 1 further comprising:
   receiving at the editor a third notification corresponding to a request to paste data from the clipboard to a target program;
   in response to the third notification, the editor accessing the data object stored in the clipboard, and the editor sending a fourth notification to the target program providing the target program with access to the data object and further providing the target program with the option to cancel the paste operation and perform the paste operation without interacting with the editor;
   in response to receiving the fourth notification, the target program determining whether to accept the data object;
   upon accepting the data object, the target program determining whether to select a format or to accept a default format determined by the editor; and
   upon the target program selecting a format, pasting the data corresponding to the selected format into an element of the target program.

8. The computer-readable storage medium of claim 3 wherein the mechanism by which the source program may cancel the copying of data to the data object of the clipboard comprises a cancel command method that was provided to the source program as an argument of the second notification.

9. The computer-readable storage medium of claim 8 wherein after canceling the copying, the source program performs the copying of the data to the clipboard without interacting with the editor.

10. The computer-readable storage medium of claim 5 having further computer-executable instructions comprising, receiving a paste notification comprising a bubbling event from an element in the target program.

11. The computer-readable storage medium of claim 5 having further computer-executable instructions comprising, communicating between an editor and the target program to allow the target program to participate in the pasting of data from the clipboard.

12. The computer-readable storage medium of claim 7 wherein receiving the third notification comprises receiving a bubbling event from the element in the target program.

13. The computer-readable storage medium of claim 7 wherein the fourth notification sent to the target program includes a mechanism by which the target program may cancel the pasting of data to the element of the target program.

14. The computer-readable storage medium of claim 7 wherein the option comprises a member that is set by the target program and wherein upon setting the member, the target program performs the paste operation without interacting with the editor.

15. The computer-readable storage medium of claim 7 wherein the fourth notification sent to the target program includes a mechanism by which the target program may change a property of the data object.

16. In a computing environment having at least one computing device, a system comprising:
   a memory storing a clipboard, the memory communicating with a processor, the memory further storing machine instructions that cause the processor to carry out a method for allowing a source program to participate in a copy process, the method comprising:
      receiving at an editor of an operating system a first notification corresponding to a request to copy data from the source program to a data object of the clipboard of the operating system;
      in response to the first notification, the editor sending a second notification to the source program, the second notification including a first format that the editor of the operating system proposes for the data to be copied from the source program to the data object of the clipboard of the operating system;
      upon receiving the second notification, the source program determining whether to accept the first format that was proposed by the editor for inclusion in the data object such that if the source program accepts the first format, the data is copied from the source program and stored in the data object in the first format, otherwise, if the source program rejects the first format, the data is not stored in the data object in the first format; and
      providing the source program with access to the data object such that the source program directly copies the data from the source program and stores the data in the data object in a second format, the second format being determined by the source program rather than being proposed by the editor.

17. The system of claim 16 wherein the method further comprises the editor communicating with a target program to paste data from the clipboard into the target program.

18. A method for allowing a computer program to participate in a copy process such that the computer program may specify which formats of data that is selected to be copied to a clipboard will be included on the clipboard, the method comprising the following steps that are performed by a source program:
   receiving user input that selects a portion of data being displayed within the source program;
   receiving user input that specifies that the selected portion of data is to be copied to the clipboard of the operating system;
   sending a request to copy the selected portion of data to an editor of the operating system;
   receiving a notification from the editor that specifies a first format for the selected portion of the data to be copied to the clipboard;
   rejecting the first format proposed by the editor such that the selected portion of data is not stored on the clipboard in the first format; and
   specifying a second format to the editor for the selected portion of the data to be copied to the clipboard such that the second format is stored on the clipboard even though the editor did not propose the format.

* * * * *